(12) United States Patent
de Swardt

(10) Patent No.: US 11,605,994 B2
(45) Date of Patent: Mar. 14, 2023

(54) WINDING INSULATION SYSTEM

(71) Applicant: The Timken Company, North Canton, OH (US)

(72) Inventor: Jan de Swardt, Eustis, FL (US)

(73) Assignee: The Timken Company, North Canton, OH (US)

(*) Notice: Subject to any disclaimer, the term of this patent is extended or adjusted under 35 U.S.C. 154(b) by 0 days.

(21) Appl. No.: 17/530,844

(22) Filed: Nov. 19, 2021

(65) Prior Publication Data

US 2022/0376577 A1 Nov. 24, 2022

Related U.S. Application Data

(60) Provisional application No. 63/192,388, filed on May 24, 2021.

(51) Int. Cl.
| | |
|---|---|
| *H01B 3/04* | (2006.01) |
| *H02K 3/30* | (2006.01) |
| *H02K 3/40* | (2006.01) |
| *H01B 19/00* | (2006.01) |
| *H01B 7/02* | (2006.01) |

(52) U.S. Cl.
CPC ............. *H02K 3/30* (2013.01); *H01B 7/0225* (2013.01); *H01B 7/0258* (2013.01); *H01B 19/00* (2013.01); *H02K 3/40* (2013.01)

(58) Field of Classification Search
CPC ............... H01B 3/04; H02K 3/30; H02K 3/32
See application file for complete search history.

(56) References Cited

U.S. PATENT DOCUMENTS

| | | |
|---|---|---|
| 2,821,498 A | 1/1958 | Botts |
| 2,917,420 A | 12/1959 | Foster et al. |
| 2,980,566 A | 4/1961 | Otto et al. |
| 3,042,743 A | 7/1962 | Jones |
| 3,048,651 A | 8/1962 | Howard et al. |
| 3,050,787 A | 8/1962 | Richardson et al. |
| 3,254,150 A | 5/1966 | Rogers, Jr. |
| 3,470,045 A | 9/1969 | Bronnvall et al. |
| 3,631,590 A | 1/1972 | Wichmann et al. |
| 3,735,168 A | 5/1973 | Anderson et al. |
| 3,930,915 A | 1/1976 | Mendelsohn et al. |

(Continued)

*Primary Examiner* — Chau N Nguyen
(74) *Attorney, Agent, or Firm* — Michael Best & Friedrich LLP

(57) ABSTRACT

A winding insulation system includes a set of insulated conductors, main wall insulation provided around the conductors, corona shield tape provided around the main wall insulation, stress grading tape provided around the corona shield tape, and sealing tape provided around the stress grading tape. The main wall insulation includes inner, intermediate, and outer sections. The inner section includes polyimide mica paper reinforced with any combination of the group consisting of: glass cloth, polyester film, and polyester mat, the inner section being provided in half-lap layer(s). The intermediate section includes mica paper reinforced with any combination of the group consisting of: glass cloth, polyester film, and polyester mat, the intermediate section being provided in half-lap layer(s). The outer section includes mica tape backed with aramid and reinforced with any combination of the group consisting of: glass cloth, polyester film, and polyester mat, the outer section being provided in half-lap layer(s).

18 Claims, 2 Drawing Sheets

(56) References Cited

U.S. PATENT DOCUMENTS

| | | | |
|---|---|---|---|
| 3,974,314 A * | 8/1976 | Fuchs | B32B 38/08 |
| | | | 428/308.8 |
| 4,038,741 A * | 8/1977 | Schuler | H02K 3/34 |
| | | | 174/120 SR |
| 4,259,398 A * | 3/1981 | Seino | B32B 19/02 |
| | | | 156/308.2 |
| 4,400,226 A | 8/1983 | Horrigan | |
| 4,806,806 A | 2/1989 | Hjortsberg et al. | |
| 5,099,159 A * | 3/1992 | Liptak | H02K 3/34 |
| | | | 174/120 SR |
| 5,300,844 A | 4/1994 | Schuler | |
| 5,464,949 A | 11/1995 | Markovitz et al. | |
| 6,025,239 A | 2/2000 | Yu | |
| 6,075,303 A * | 6/2000 | Schuler | H02K 3/40 |
| | | | 310/201 |
| 6,420,812 B1 | 7/2002 | Emery | |
| 6,836,204 B2 | 12/2004 | Reid et al. | |
| 7,252,118 B2 | 8/2007 | Reid | |
| 7,812,260 B2 | 10/2010 | Miller et al. | |
| 9,331,536 B2 | 5/2016 | Mabuchi et al. | |
| 10,992,199 B2 | 4/2021 | Nikrant et al. | |
| 2013/0221790 A1 | 8/2013 | Reid et al. | |
| 2014/0300241 A1 | 10/2014 | Reid et al. | |

\* cited by examiner

WINDING INSULATION SYSTEM

CROSS-REFERENCE TO RELATED APPLICATIONS

This application claims priority to U.S. Provisional Patent Application No. 63/192,388, filed on May 24, 2021, the entire contents of which is hereby incorporated by reference.

BACKGROUND

The present application relates to the production of insulation systems for insulating the windings of electric machines subjected to high field strengths. Although widely known and effective, high voltage insulation systems produced by impregnating tape with resin are only designed for use with voltages up to 22 kV.

SUMMARY

In one aspect, the invention provides a winding insulation system including a set of insulated conductors, a main wall insulation provided around the set of insulated conductors, a corona shield tape provided around the main wall insulation, a stress grading tape provided around the corona shield tape, and a sealing tape provided around the stress grading tape. The main wall insulation includes at least an inner section, an intermediate section, and an outer section. The inner section includes polyimide mica paper reinforced with any combination of the group consisting of: glass cloth, polyester film, and polyester mat, the inner section being provided in one or more half-lap layers. The intermediate section includes mica paper reinforced with any combination of the group consisting of: glass cloth, polyester film, and polyester mat, the intermediate section being provided in one or more half-lap layers. The outer section includes mica tape backed with aramid and reinforced with any combination of the group consisting of: glass cloth, polyester film, and polyester mat, the outer section being provided in one or more half-lap layers.

In another aspect, the invention provides a winding insulation system including a set of insulated conductors and a main wall insulation provided around the set of insulated conductors, the main wall insulation surrounded by a plurality of additional layers of the winding insulation system. The main wall insulation includes at least an inner section, an intermediate section, and an outer section. The inner section includes polyimide mica paper reinforced with any combination of the group consisting of: glass cloth, polyester film, and polyester mat, the inner section being provided in one or more half-lap layers. The intermediate section includes mica paper reinforced with any combination of the group consisting of: glass cloth, polyester film, and polyester mat, the intermediate section being provided in one or more half-lap layers. The outer section includes mica tape backed with aramid and reinforced with any combination of the group consisting of: glass cloth, polyester film, and polyester mat, the outer section being provided in one or more half-lap layers.

In yet another aspect, the invention provides a method of manufacturing a winding insulation system including providing a set of insulated conductors. A main wall insulation is applied around the set of insulated conductors, a corona shield tape is applied around the main wall insulation, a stress grading tape is applied around the corona shield tape, and a sealing tape is applied around the stress grading tape. Applying the main wall insulation includes applying at least an inner section, an intermediate section, and an outer section. The inner section includes polyimide mica paper reinforced with any combination of the group consisting of: glass cloth, polyester film, and polyester mat, the inner section being provided in one or more half-lap layers. The intermediate section includes mica paper reinforced with any combination of the group consisting of: glass cloth, polyester film, and polyester mat, the intermediate section being provided in one or more half-lap layers. The outer section includes mica tape backed with aramid and reinforced with any combination of the group consisting of: glass cloth, polyester film, and polyester mat, the outer section being provided in one or more half-lap layers.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The insulation system used in medium and high voltage windings (e.g., wire coils wrapped around a stator core to form a stator winding) of an electric machine, operable in some cases as a motor and/or generator, are subjected to high field strengths. Typically, medium and high voltage insulation systems are only rated up to 22 kV, due to the higher field strengths over this voltage and the difficulty to impregnate sufficient number of layers of tape required for higher voltages. Using combinations of advanced insulation tapes and a low viscosity resin, sufficient electrical insulation can be achieved in order to insulate windings over 22 kV, up to and including 25 kV.

Figure 1:
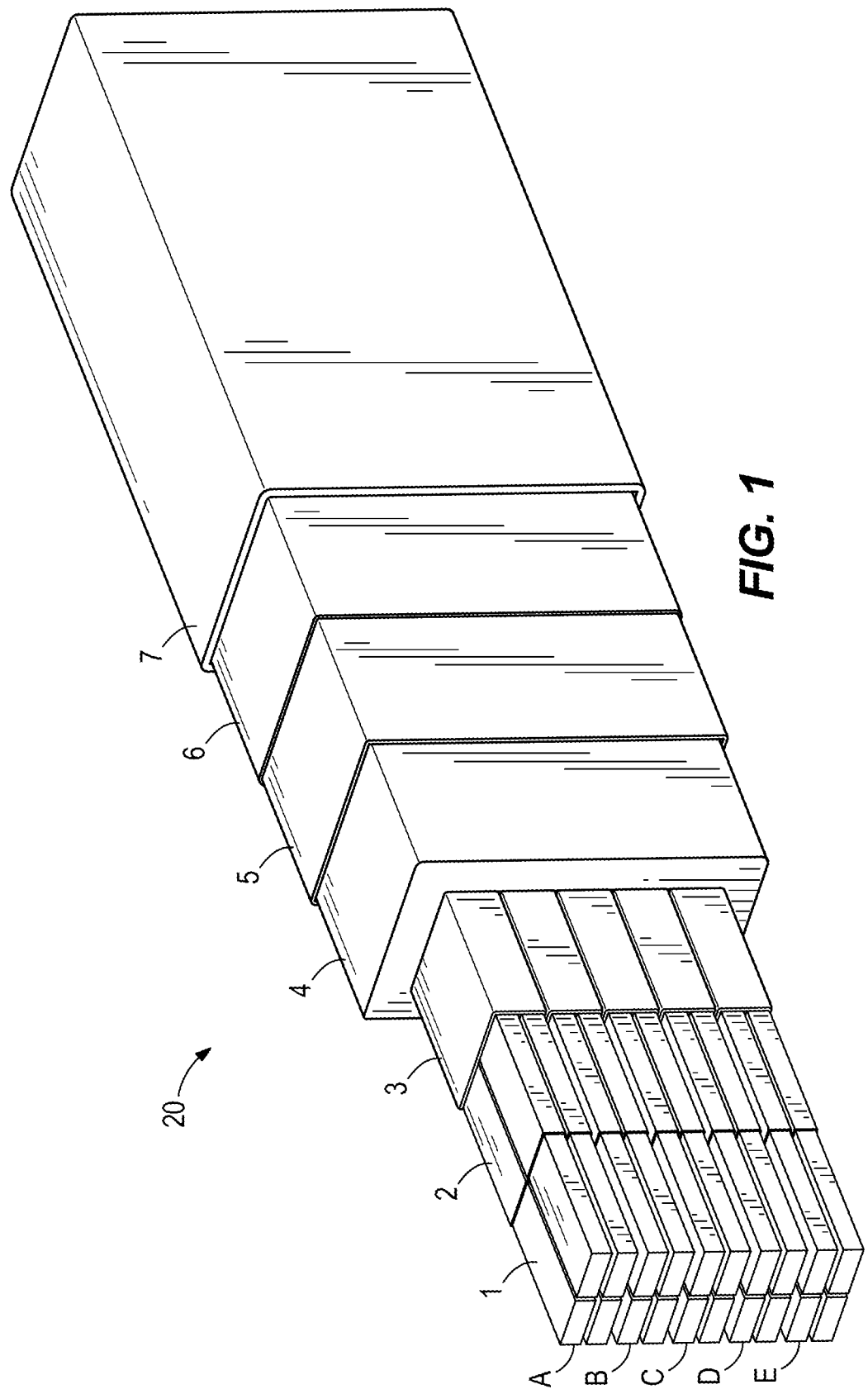
FIG. 1 is a perspective view of a coil for an electric machine winding, the coil having sequential cutaways showing the various sections or layers thereof.

Before the method is described, it is noted that FIG. 1 illustrates an exemplary layout for a coil 20. At the center of the coil 20 is a conductor 1. The conductor 1 is made from a conductive material such as copper or aluminum for example. The conductor 1 is annealed to ensure ductility and excellent formability during the coil manufacturing process. The conductor 1 has smooth radiused edges to reduce high field concentrations. Covering the conductor 1 is an insulating layer, referred to as conductor insulation 2. The conductor insulation 2 may include multiple coats of a type of resin of modified polyester layers and/or polyamide-imide layers and/or polyimide layers and/or layers of glass yarn and resin and/or multiple layers of mica paper reinforced with glass cloth, polyester film, or polyester mat. Depending on the machine design, the conductors 1 with the conductor insulation 2, which form insulated conductors, are arranged together in multiple parallel sets. Each parallel set together forms a turn A, B, C, D, E. FIG. 1 illustrates two conductors 1 in the width and two conductors 1 in the height to together form four conductors 1 in parallel per turn. FIG. 1 illustrates one coil 20 wound with 5 turns A-E, or 5 turns per coil. However, it will be appreciated that the disclosure may be applicable to other arrangements.

Figure 2:
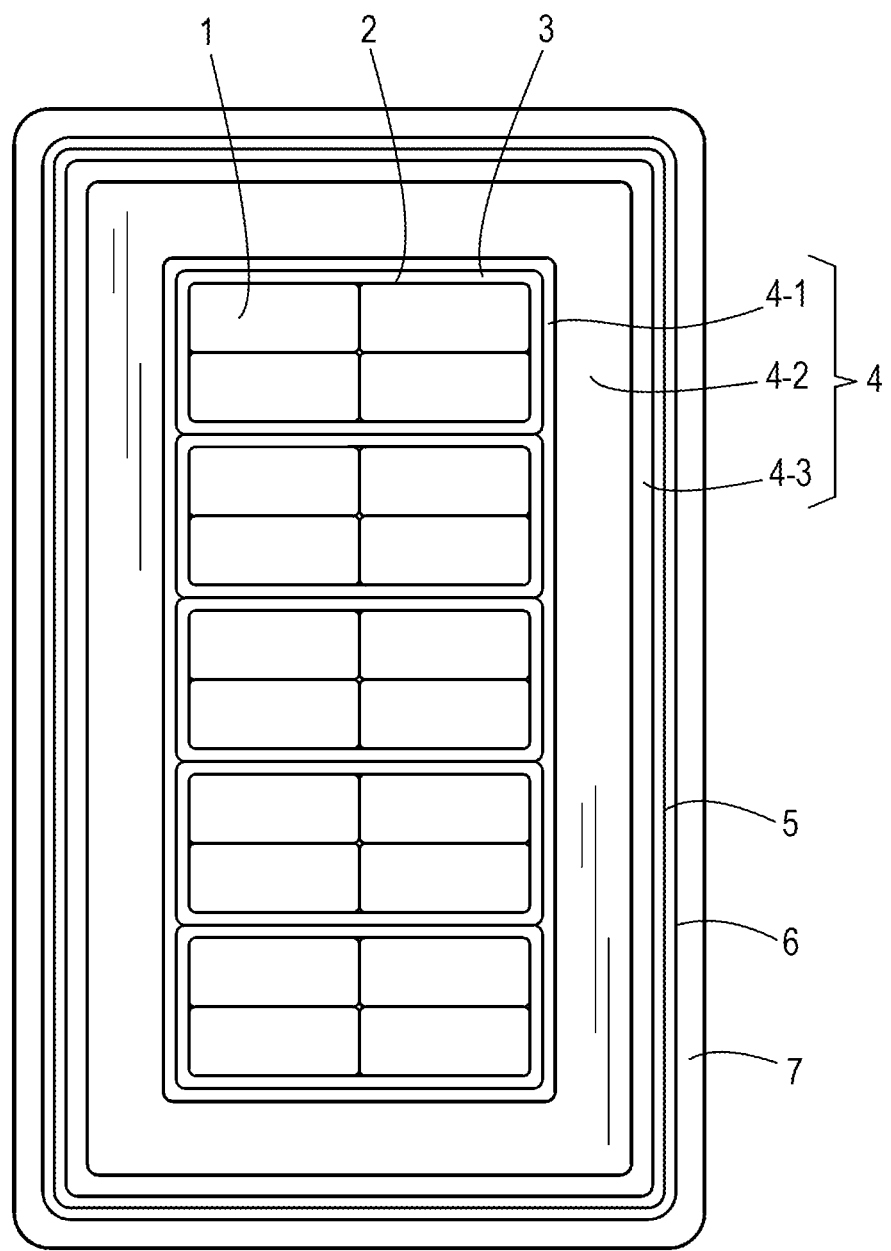
FIG. 2 is a section view of the coil of FIG. 1 wherein the main wall insulation is shown in more detail as having three separate sections.

Depending on the machine design, a dedicated turn insulation 3 may be applied. For example, each turn A-E is covered with one or more layers of mica paper reinforced with glass cloth, polyester film, or polyester mat that constitute the turn insulation 3. The turn insulation 3 extends around the collection of insulated conductors 1 in the turn, rather than around the individual insulated conductors 1. Main wall insulation 4 is provided outside the turn insulation 3, if present, and includes several layers of tape, that may include one or more layers of mica paper reinforced with glass cloth, polyester film, or polyester mat, and polyimide film, one or more layers of layers of mica paper reinforced with glass cloth, polyester film, and one or more layer of aramid-backed mica tape reinforced with glass or polyester. The main wall insulation 4 is shown simply in FIG. 1, while FIG. 2 is used to illustrate greater detail in accordance with the description below. The main wall insulation 4 is wrapped around the turns A-E of the coil collectively, rather than wrapped around the turns individually like the turn insulation 3. Furthermore, a corona shield tape 5 can be provided outside the main wall insulation 4. The corona shield tape 5 is a low resistivity tape (e.g., 300 to 1000 Ohm/cm) including glass fabric, impregnated with an electrically conductive varnish, and optionally nano particles, to improve electrical and thermal properties as well as erosion resistance.

A stress grading tape 6 can be provided outside the corona shield tape 5. The stress grading tape 6 is a voltage variable resistivity tape including woven polyester fabric tape with selvage, impregnated with an electrically semi conductive varnish. A sealing tape 7 can be provided outside the stress grading tape 6. The sealing tape 7 forms an outer layer that is smooth (reducing build-up of surface contaminants) and waterproof surface finish. The sealing tape 7 can be a polyester fabric tape impregnated with a thermosetting epoxy resin.

The method of manufacturing or applying the winding insulation system can be described as follows. The coil 20 is insulated with the main wall insulation 4 that includes several layers of tape, for example at least three different sections of different types of tape. The tape layers of the main wall insulation 4 can include, from inside to outside, a first or inner section 4-1, a second or intermediate section 4-2 different from the inner section 4-1. and a third or outer section 4-3 different from the inner and intermediate sections 4-1, 4-2 (FIG. 2). The tape layers of the main wall insulation 4 are applied sequentially, one over the other. The inner section 4-1 of the main wall insulation 4 can have the highest temperature rating among the sections of the main wall insulation 4. The inner section 4-1 can include polyimide mica paper (e.g., mica paper laminated together with polyimide film) reinforced with any combination of the group consisting of: glass cloth, polyester film, and polyester mat. The multiple constituents of the inner section 4-1 can be laminated together to form a tape. The intermediate section 4-2 can be the largest section within the main wall insulation 4, by thickness and/or number of layers. For example, the intermediate section 4-2 can be at least two times or at least three times each of the other main wall sections 4-1, 4-2, either by thickness or number of tape layers. The intermediate section 4-2 can include mica paper reinforced with any combination of the group consisting of: glass cloth, polyester film, and polyester mat. The multiple constituents of the intermediate section 4-2 can be laminated together to form a tape. The outer section 4-3 can be the most porous among the sections of the main wall insulation 4. The outer section 4-3 can include mica tape backed with aramid and reinforced with any combination of the group consisting of: glass cloth, polyester film, and polyester mat. The multiple constituents of the outer section 4-3 can be laminated together to form a tape.

In some constructions, the various sections of the main wall insulation 4 include multiple layers (half-lap layers) of each of the first, second, and third tape types. In some constructions, the main wall insulation 4 in total forms at least 18 half-lap insulation layers. In some constructions, the number of insulation layers is at least 26. In some constructions, the number of insulation layers can be up to 50. A half-lap layer refers to winding the tape along the coil length such that consecutive wraps overlap the prior wrap by about half the tape width. On top of the main wall insulation 4, an additional corona protection tape 5 can optionally be applied. The coils 20 are then impregnated by a low viscosity epoxy, polyester or silicone resin and cured to form a solid (i.e., voidless) insulation that is suitable for 25 kV. The term "low viscosity," which can apply to any of the stated resins, may be considered a term of art commonly used in the industry as a means for categorizing resins. In some constructions, "low viscosity" may refer to a resin having a viscosity of less than 2000 cPs at 77° F. when tested according to IEC 60455.

What is claimed is:

1. A winding insulation system comprising:
    a set of insulated conductors;
    a main wall insulation provided around the set of insulated conductors;
    a corona shield tape provided around the main wall insulation;
    a stress grading tape provided around the corona shield tape; and
    a sealing tape provided around the stress grading tape,
    wherein the main wall insulation includes at least:
        an inner section including polyimide mica paper reinforced with any combination of the group consisting of: glass cloth, polyester film, and polyester mat, the inner section being provided in one or more half-lap layers,
        an intermediate section including mica paper reinforced with any combination of the group consisting of: glass cloth, polyester film, and polyester mat, the intermediate section being provided in one or more half-lap layers, and
        an outer section including mica tape backed with aramid and reinforced with any combination of the group consisting of: glass cloth, polyester film, and polyester mat, the outer section being provided in one or more half-lap layers,
    wherein the corona shield tape is a low resistivity tape including glass fabric, impregnated with an electrically conductive varnish, and nano particles.

2. The winding insulation system of claim 1, wherein the main wall insulation is provided in at least 18 half-lap layers.

3. The winding insulation system of claim 1, wherein the intermediate section has more layers than the inner section and has more layers than the outer section.

4. The winding insulation system of claim 1, wherein of the constituent sections of the main wall insulation, the inner section has the highest temperature rating and the outer section is the most porous.

5. The winding insulation system of claim 1, wherein the stress grading tape is a voltage variable resistivity tape including woven polyester fabric tape with selvage, impregnated with an electrically semi conductive varnish, and wherein the sealing tape is polyester fabric tape impregnated with a thermosetting epoxy resin.

6. The winding insulation system of claim 1, further comprising a turn insulation provided between the set of insulated conductors and the main wall insulation, the turn insulation including one or more layers of reinforced mica paper.

7. A winding insulation system comprising:
a set of insulated conductors; and
a main wall insulation provided around the set of insulated conductors, the main wall insulation surrounded by a plurality of additional layers of the winding insulation system,
wherein the main wall insulation includes at least:
an inner section including polyimide mica paper reinforced with any combination of the group consisting of: glass cloth, polyester film, and polyester mat, the inner section being provided in one or more half-lap layers,
an intermediate section including mica paper reinforced with any combination of the group consisting of: glass cloth, polyester film, and polyester mat, the intermediate section being provided in one or more half-lap layers, and
an outer section including mica tape backed with aramid and reinforced with any combination of the group consisting of: glass cloth, polyester film, and polyester mat, the outer section being provided in one or more half-lap layers,
wherein of the constituent sections of the main wall insulation, the inner section has the highest temperature rating, and the outer section is the most porous.

8. The winding insulation system of claim 7, wherein the main wall insulation is provided in at least 18 half-lap layers.

9. The winding insulation system of claim 7, wherein the intermediate section has more layers than the inner section and has more layers than the outer section.

10. The winding insulation system of claim 7, wherein the plurality of additional layers includes:
a corona shield tape provided around the main wall insulation;
a stress grading tape provided around the corona shield tape; and
a sealing tape provided around the stress grading tape.

11. The winding insulation system of claim 10, wherein the corona shield tape is a low resistivity tape including glass fabric, impregnated with an electrically conductive varnish, and nano particles.

12. The winding insulation system of claim 10, wherein the stress grading tape is a voltage variable resistivity tape including woven polyester fabric tape with selvage, impregnated with an electrically semi conductive varnish, and wherein the sealing tape is polyester fabric tape impregnated with a thermosetting epoxy resin.

13. The winding insulation system of claim 7, further comprising a turn insulation provided between the set of insulated conductors and the main wall insulation, the turn insulation including one or more layers of reinforced mica paper.

14. A winding insulation system comprising:
a set of insulated conductors;
a main wall insulation provided around the set of insulated conductors;
a corona shield tape provided around the main wall insulation;
a stress grading tape provided around the corona shield tape; and
a sealing tape provided around the stress grading tape,
wherein the main wall insulation includes at least:
an inner section including polyimide mica paper reinforced with any combination of the group consisting of: glass cloth, polyester film, and polyester mat, the inner section being provided in one or more half-lap layers,
an intermediate section including mica paper reinforced with any combination of the group consisting of: glass cloth, polyester film, and polyester mat, the intermediate section being provided in one or more half-lap layers, and
an outer section including mica tape backed with aramid and reinforced with any combination of the group consisting of: glass cloth, polyester film, and polyester mat, the outer section being provided in one or more half-lap layers,
wherein the stress grading tape is a voltage variable resistivity tape including woven polyester fabric tape with selvage, impregnated with an electrically semi conductive varnish, and wherein the sealing tape is polyester fabric tape impregnated with a thermosetting epoxy resin.

15. The winding insulation system of claim 14, wherein the main wall insulation is provided in at least 18 half-lap layers.

16. The winding insulation system of claim 14, wherein the intermediate section has more layers than the inner section and has more layers than the outer section.

17. The winding insulation system of claim 14, wherein of the constituent sections of the main wall insulation, the inner section has the highest temperature rating and the outer section is the most porous.

18. The winding insulation system of claim 14, further comprising a turn insulation provided between the set of insulated conductors and the main wall insulation, the turn insulation including one or more layers of reinforced mica paper.

* * * * *